United States Patent [19]

Ishioka et al.

[11] Patent Number: 5,483,592
[45] Date of Patent: Jan. 9, 1996

[54] RINGER UNIT DRIVING SYSTEM IN A SUBSCRIBER TRANSMISSION SYSTEM

[75] Inventors: Yuzuru Ishioka; Rika Got, both of Kawasaki, Japan

[73] Assignee: Fujitsu Limited, Kawasaki, Japan

[21] Appl. No.: 23,818

[22] Filed: Feb. 25, 1993

[30] Foreign Application Priority Data

Feb. 27, 1992 [JP] Japan .................. 4-041719

[51] Int. Cl.⁶ .................................. H04M 5/00
[52] U.S. Cl. .................... 379/373; 379/375; 379/377; 379/252; 379/253
[58] Field of Search .................... 379/373, 377, 379/372, 350, 405, 3, 6, 374, 375, 252, 253, 254, 255; 370/84, 110.1, 112

[56] References Cited

U.S. PATENT DOCUMENTS

| | | | |
|---|---|---|---|
| 4,239,941 | 12/1980 | Gauthier et al. | 379/418 |
| 4,611,097 | 9/1986 | Grimes | 379/253 |
| 4,989,235 | 1/1991 | Nemoto | 379/215 |
| 5,144,625 | 9/1992 | Cain et al. | 370/112 |
| 5,307,407 | 4/1994 | Wendt et al. | 379/253 |

FOREIGN PATENT DOCUMENTS

| | | |
|---|---|---|
| 64-39188 | 2/1989 | Japan . |
| 3-166551 | 11/1991 | Japan . |
| 3-266551 | 11/1991 | Japan . |

*Primary Examiner*—Jeffery A. Hofsass
*Assistant Examiner*—Jacques M. Saint-Surin
*Attorney, Agent, or Firm*—Greer, Burns & Crain, Ltd.

[57] ABSTRACT

In a ringer unit driving system for driving a ringer unit provided in common to a plurality of channel units, the ringer unit sends a ringing signal to a communications device via one of the channel units. A signaling bit detection unit, which is provided in each of the channel units, detects a signaling bit contained in a received digital signal applied to one of the channel units and generates a detection signal. A ringer provided in the ringer unit generates the ringing signal. A power source supplies the ringer with power. A switch is connected between the ringer and the power source and is connected to the signaling bit detection unit. The switch connects the power source and the ringer to each other only when the signaling bit detection unit generates the detection signal.

7 Claims, 5 Drawing Sheets

RINGER UNIT DRIVING SYSTEM IN A SUBSCRIBER TRANSMISSION SYSTEM

BACKGROUND OF THE INVENTION

1. Field of the Invention

The present invention generally relates to a ringer unit driving system in a subscriber transmission system of a communications network, and more particularly to a ringer unit driving system provided in a channel unit provided between an exchange and a subscriber terminal, such as a telephone set.

2. Description of the Prior Art

FIG. 1 illustrates a subscriber transmission system, which includes an exchange EX, a remote terminal RT, a distance terminal DT, and telephone sets 1. The exchange EX, which is connected to networks, includes a switch SW, a central office terminal COT, and ringer units 2. The central office terminal COT converts analog signals from the switch SW into digital signals, and multiplexes these digital signals. A multiplexed digital signal is sent to a coaxial cable CO, which connects the central office terminal COT and the remote terminal RT. Further, the central office terminal COT receives a multiplexed digital signal from the coaxial cable CO and demultiplexes it into digital signals. Then, the central office terminal COT converts the digital signals into analog signals, which are sent to the switch SW. Telephone sets 1 are connected to the switch SW via subscriber lines VF (only one telephone set is illustrated for the sake of simplicity). One ringer unit 2 is connected to the switch SW.

The remote terminal RT, connected to the exchange EX via the coaxial cable CO, includes channel units CU, which have the functions of demultiplexing the received multiplexed signal into digital signals and converting the digital signals into analog signals to be sent to the telephone sets 1 connected to the remote terminal RT via the subscriber lines VF (only telephone set 1 is illustrated for the sake of simplicity). The channel units CU also have the functions of converting analog signals received from telephone sets 1 connected thereto into digital signals and multiplexing these digital signals and digital signals received from an optical fiber cable OF into a multiplexed digital signal. The remote terminal RT has the function of converting optical signals into electric signals and converting electric signals into optical signals. One ringer unit 2 is connected to the remote terminal RT and is provided in common to the channel units CU of the remote terminal RT.

The distance terminal DT includes a plurality of channel units CU, which are respectively connected to a plurality of telephone sets 1 (only one telephone set 1 is illustrated for the sake of simplicity). One ringer unit 2 is connected to the distance terminal DT and is provided in common to the channel units CU of the distance terminal DT. The channel units CU have the functions of demultiplexing the multiplexed digital signal from the optical fiber into digital signals and converting the digital signals into analog signals to be sent to the telephone sets 1. The channel units CU also have the functions of converting analog signals from the telephone sets 1 into digital signals and multiplexing these digital signals into a multiplexed digital signal. The distance terminal DT has the function of converting electric signals into optical signals and converting optical signals into electric signals.

When the telephone set 1 connected to the switch SW calls the telephone set 1 connected to the remote terminal RT, a ringing signal generated by the ringer unit 2 connected to the switch SW is sent to the central office terminal COT, which converts the ringing signal into a signaling signal (signaling bit). The channel unit CU in the remote terminal RT connected to the called telephone set 1 detects the signaling bit from the exchange EX, and drives the ringer unit 2 connected to the remote terminal RT.

FIG. 2 is a block diagram of channel units CU#1–CU#N, provided in either the remote terminal RT or the distance terminals DT, and the corresponding ringer unit 2. The channel unit CU#1 includes a D/A converter 11, a signaling detector 12, a switch driver 14 and a switch 14. The D/A converter 11 converts the received digital signal into an analog signal to be sent to the telephone set 1. The signaling detector 12 detects the signaling bit contained in the received digital signal. The switch driver 13 turns ON the switch 14 when the signaling bit is detected. The other channel units have the same configuration as the channel unit CU#1.

The ringer unit 2 includes a ringer 2a and a ringer driving source 2b. The output terminal of the ringer unit 2 is connected in common to the switch 14 of the channel units CU#1–CU#N.

The exchange EX drives the bell of the called telephone set 1 connected to the channel unit CU#1 in the following manner. The switch SW outputs the ringing signal (20 Hz, for example) generated by the ringer unit 2 to the central office terminal COT, which converts the ringer signal into the signaling bit. The signaling detector 12 of the channel unit CU#1 detects the signaling bit contained in the received digital signal, and sends a detection signal to the switch driver 13. In response to the detection signal, the switch driver 13 turns ON the switch 14, so the ringing signal generated by the ringer 2a is sent to the telephone set 1 via the switch 14.

The ringer driving source 2b in the remote terminal RT or the distance terminal DT obtains energy from a commercial source. Alternatively, the ringer driving source 2b in the distance terminal DT is a power source driven by the power source provided in the remote terminal RT. In this case, an additional cable is provided between the remote terminal RT and the distance terminal DT, and energy generated by the power source in the remote terminal RT is transferred to the distance terminal via the additional cable.

As shown in FIG. 2, the ringer driving source 2b is permanently connected to the ringer 2a. If the ringer unit 2 is often connected to one of the channel units CU#1–CU#N, the ringer driving source 2b is efficiently used. However, if the ringer unit 2 is not often connected to one of the channel units CU#1–CU#N, the ringer 2a wastefully consumes energy supplied by the ringer driving unit 2b. Normally, the remote terminal RT or the distance terminal DT accommodates a smaller number of terminals than the exchange EX, and the time for which the ringer unit 2 is not needed in the RT or DT will be much longer than the time for which the ringer is not needed in the exchange EX. Hence, a larger quantity of power is wasted in the remote terminal RT or the distance terminal DT than that in the exchange EX.

In order to reduce energy wasted in the ringer unit, Japanese Laid-Open Patent Publication No. 64-39188 discloses a radio telephone system in which an amplifier of a ringer generating circuit provided in a slave station is turned ON only when the slave station receives a ringer driving signal from a ground (master) station. However, the ringer itself (which corresponds to the ringer 2a shown in FIG. 2) is always supplied with energy from the ringer driving source. Hence, the ringer consumes energy even when the ringer generating circuit is maintained in the inactive state in which the ringer is not connected to any of the telephone sets.

The above problem will be serious when the ringer driving source 2b fails to supply energy due to a failure. In this case, a backup battery (not shown in FIG. 2) is connected to the ringer 2a instead of the ringer driving source 2b. In this case, the backup battery is always connected irrespective of whether or not the ringer unit 2 is needed, and the ringer 2b wastes energy generated by the backup battery.

SUMMARY OF THE INVENTION

It is a general object of the present invention to provide a ringer unit driving system in which the above disadvantages are eliminated.

A more specific object of the present invention is to provide a ringer unit driving system consuming a smaller quantity of energy than that in the conventional ringer unit driving system.

The above objects of the present invention are achieved by a ringer unit driving system for driving a ringer unit provided in common to a plurality of channel units, the ringer unit sending a ringing signal to a communications device via one of the channel units, said ringer unit driving system comprising:

signaling bit detection means, provided in each of the channel units, for detecting a signaling bit contained in a received digital signal applied to one of the channel units and for generating a detection signal;

ringer means, provided in the ringer unit, for generating the ringing signal;

power source means for supplying the ringer means with power; and switch means, connected between the ringer means and the power source means and connected to the signaling bit detection means, for connecting the power source means and the ringer means to each other only when the signaling bit detection means generates the detection signal.

Another object of the present invention is to provide a subscriber communications system having the above-mentioned ringer unit driving system.

This object of the present invention is achieved by a subscriber communications system comprising:

a plurality of channel units respectively connected to communications devices;

multiplexer/demultiplexer means for performing a multiplexing operation on transmission digital signals received from the channel units and a demultiplexing operation on a reception digital signal received from a transmission line connected to the subscriber transmission system;

a ringer unit provided in common to the channel units, the ringer unit sending a ringing signal to one of the communications devices via one of the channel units; and a ringer unit driving system driving the ringer unit.

The ringer unit driving system comprises:

signaling bit detection means, provided in each of the channel units, for detecting a signaling bit contained in the reception digital signal received by one of the channel units and for generating a detection signal;

ringer means, provided in the ringer unit, for generating the ringing signal;

power source means for supplying the ringer means with power; and first switch means, connected between the ringer means and the power source means and connected to the signaling bit detection means, for connecting the power source means and the ringer means to each other only when the signaling bit detection means in one of the channel units generates the detection signal.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 3:
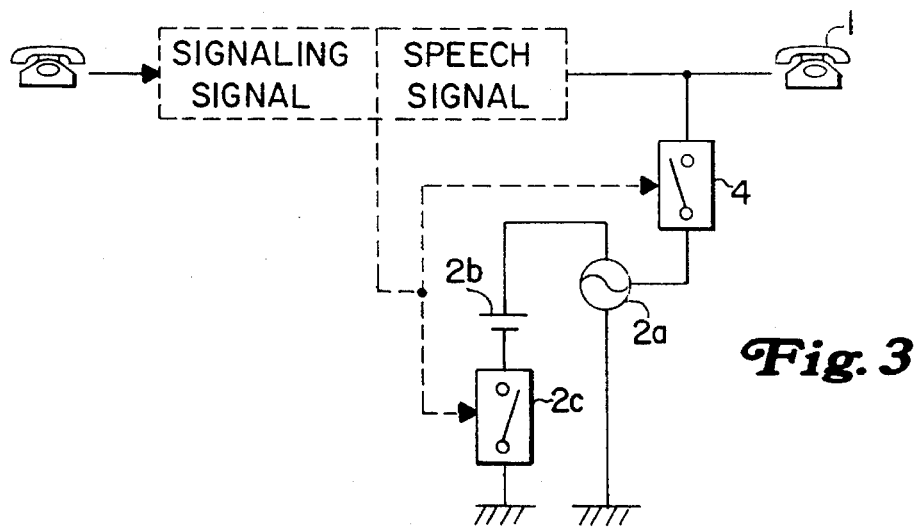
FIG. 3 is a block diagram illustrating an overview of a ringer unit driving system of the present invention.

FIG. 3 is a block diagram illustrating an overview of a ringer unit driving system of the present invention. In FIG. 3, parts that are the same as parts shown in the previously described figures are given the same reference numbers. A switch 2c is connected between the minus terminal of the ringer driving source 2b and ground. The switch 2c is controlled in response to the signaling bit. Normally, the switch 2c is maintained in the OFF state. When the signaling bit is detected, the switches 4 and 2c are turned ON. Hence, the minus terminal of the ringer driving source 2b is grounded, and energy is supplied to the ringer 2a. The ringing signal generated by the ringer 2a passes through the switch 4 and is applied to the telephone set 1. With the above configuration, energy is supplied to the ringer 2a only when the ringer 2a is needed, and hence the consumption of energy in the ringer 2a can be greatly reduced.

Figure 1:
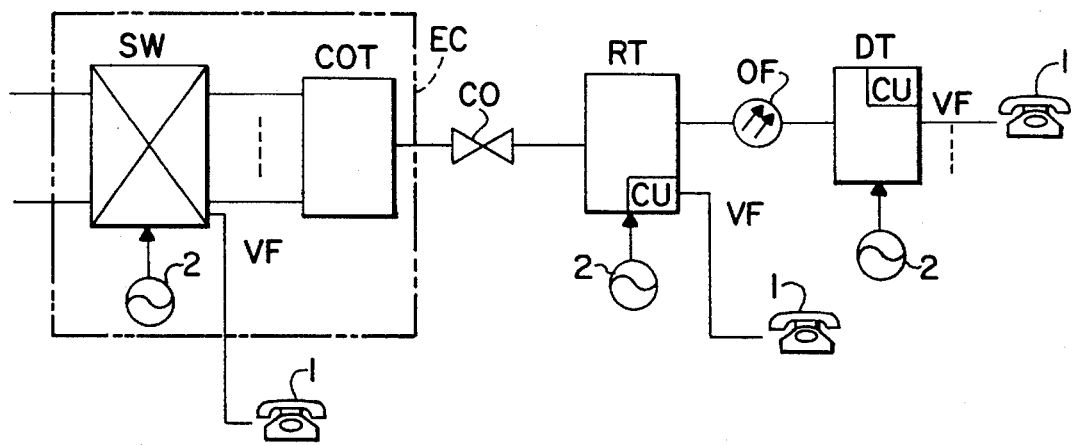
FIG. 1 is a block diagram of a subscriber transmission system in a digital communications network.
Figure 2:
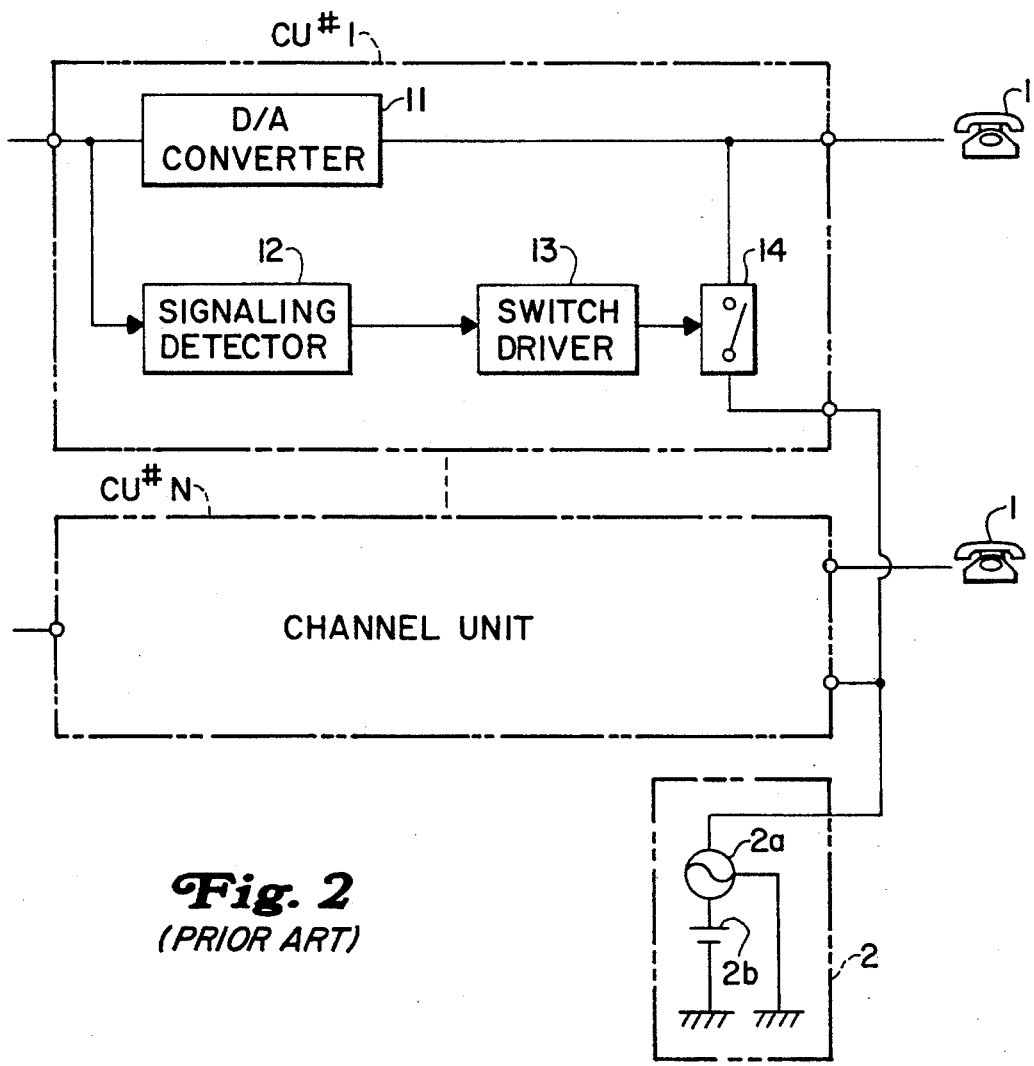
FIG. 2 is a block diagram of channel units and a conventional ringer unit driving system.
Figure 4:
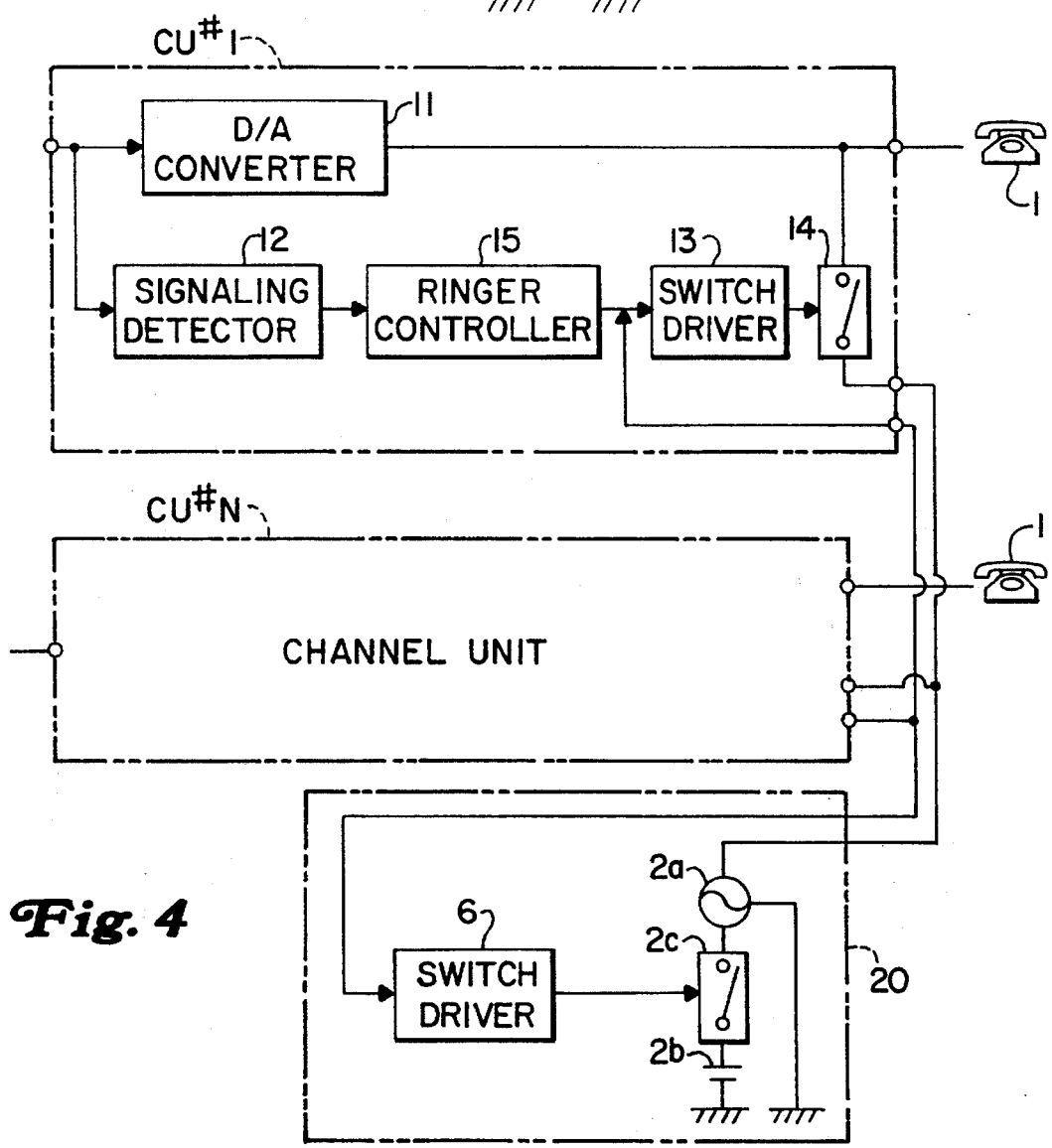
FIG. 4 is a block diagram of an embodiment of the present invention.

FIG. 4 is a block diagram of channel units CU#1–CU#N provided in either the remote terminal RT or the distance terminal DT shown in FIG. 1. In FIG. 4, parts that are the same as parts shown in the previously described figures are given the same reference numbers. A ringer controller 15 is provided between the signaling detector 12 and the switch driver 13 in each of the channel units CU#1–CU#N. A switch driver 6 of a ringer unit 20 is provided between a control terminal of the switch 2c and the ringer controller 15.

When the telephone set 1 connected to the channel unit CU#1 shown in FIG. 4 is called, the signaling detector 12 detects the signaling bit contained in the received digital signal, and outputs the detection signal to the ringer controller 15. The signaling bit is transferred in the previous manner described with reference to FIG. 1. In response to the detection signal, the ringer controller 15 generates a driving signal, which is applied to the switch drivers 13 and 6. In response to the driving signal, the switch driver 6 turns the switch 2c ON, and the ringer driving source 2b is connected to the ringer 2a via the switch 2c.

In response to the driving signal, the switch driver 13 turns the switch 14 ON, and the ringing signal generated by the ringer 2a is applied to the telephone set 1 via the switch 14. In this manner, the bell in the telephone set 1 is driven by the ringer signal. It is to be noted that the ringer 2a is supplied, via the switch 2c, with energy generated by the ringer driving source 2b only when the ringer unit 20 is needed.

The D/A converter 11 converts the digital speech signal into an analog speech signal, which is applied to the telephone set 1.

Figure 5:
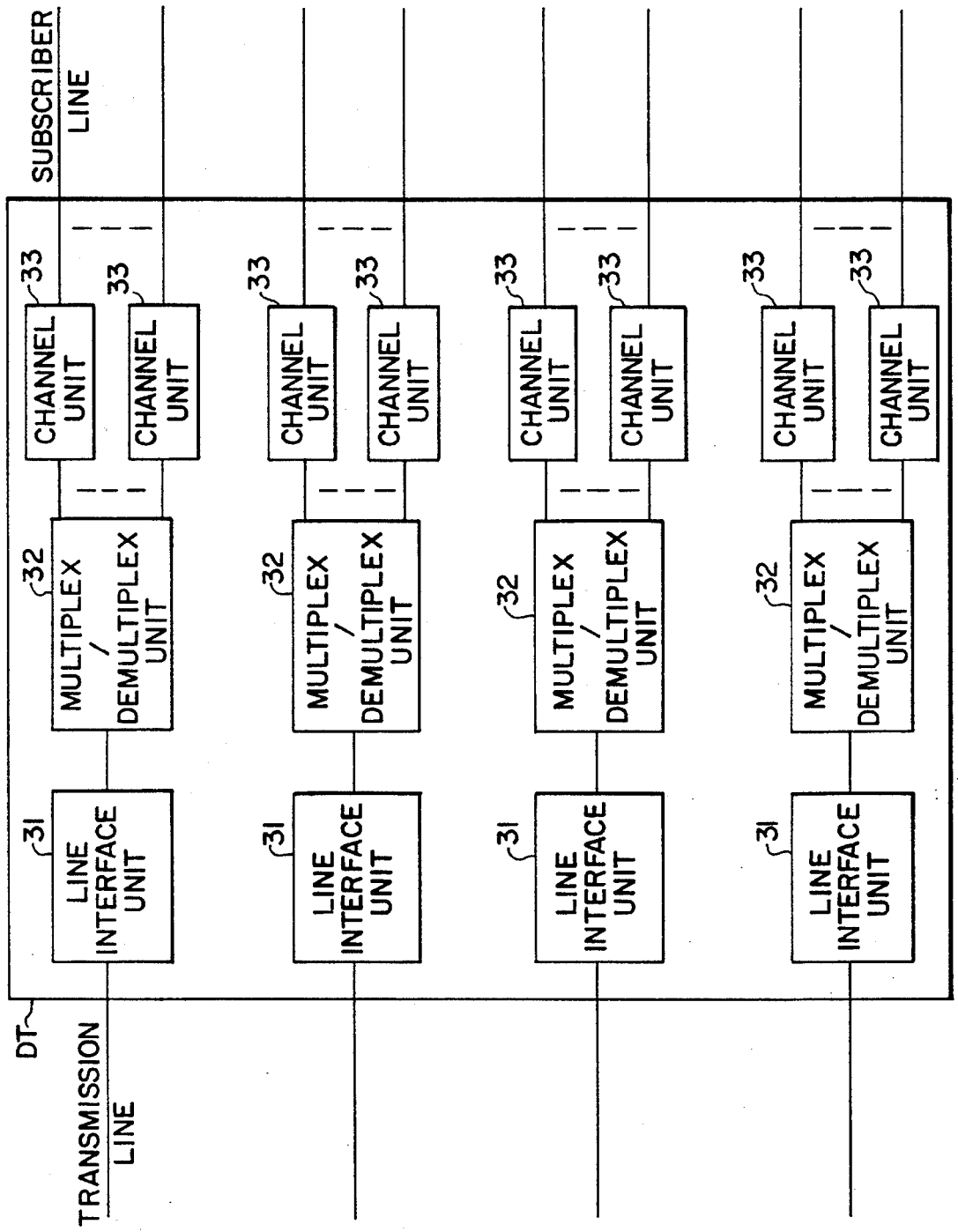
FIG. 5 is a block diagram of a distance terminal to which the present invention is applied.

FIG. 5 is a block diagram of the configuration of the distance terminal DT. As shown in FIG. 5, the distance terminal DT is connected to a plurality of transmission lines formed of optical fiber cables or metallic cables, and a plurality of subscriber lines. The distance terminal DT shown in FIG. 5 is connected to four transmission lines. The distance terminal DT includes line interface units 31, multiplexer/demultiplexers 32 and a plurality of channel units 33. The line interface units 31 establish an interface between the transmission lines and the distance terminal DT. In the case where the line interface units 31 are connected to the optical fiber cables OF, they are provided with a function of converting an optical signal into an electric signal and converting an electric signal into an optical signal. The multiplexer/demultiplexers 32 execute a multiplexing operation on digital signals from the channel units 33 and a demultiplexing operation on the multiplexed digital signal from the line interface units 31. The channel units 33 are connected to the subscriber lines VF.

The remote terminal RT has a configuration similar to the configuration of the distance terminal DT.

Figure 6:
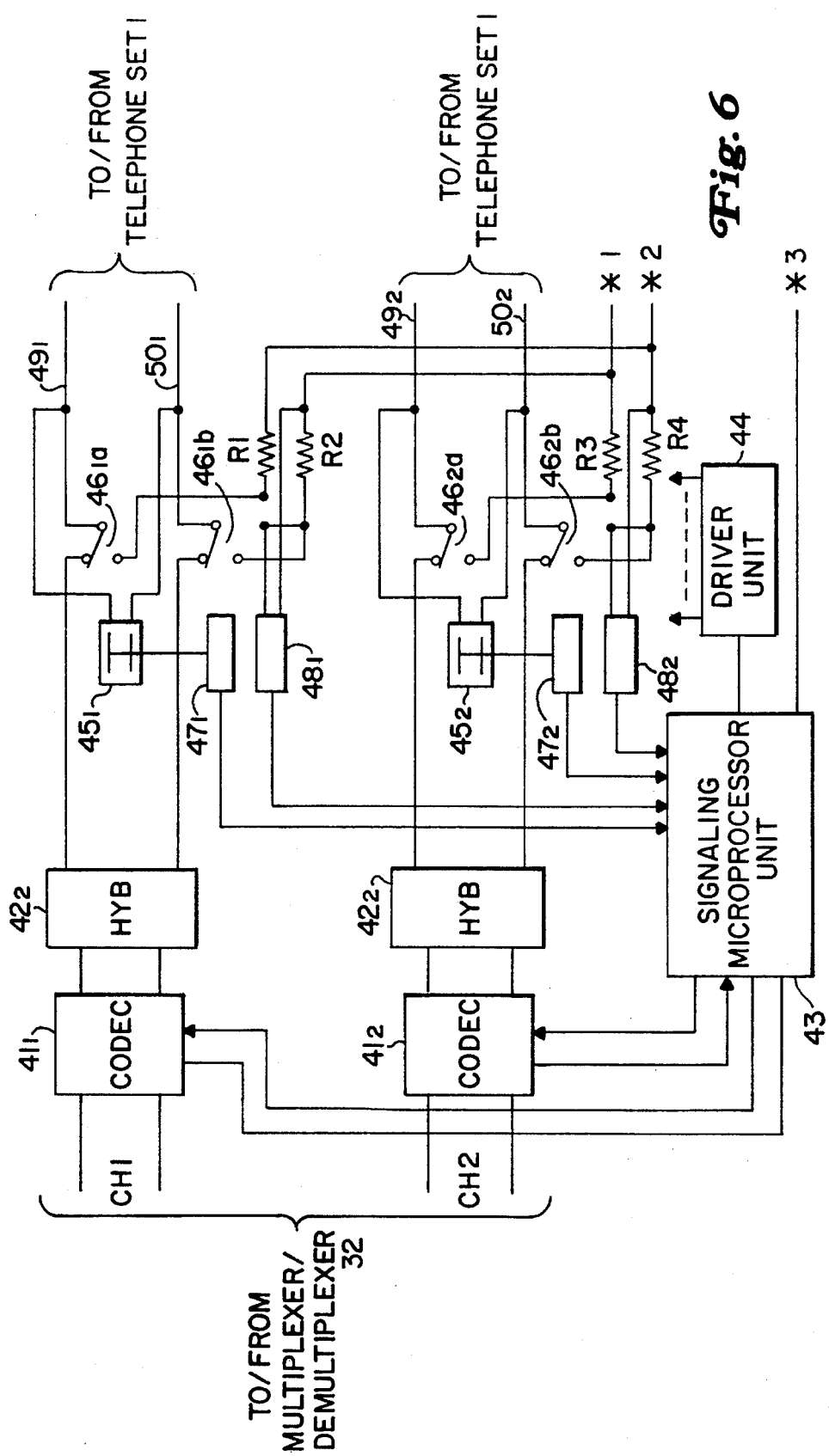
FIG. 6 is a block diagram of channel units.

FIG. 6 is a block diagram of two channel units (channels CH1 and CH2) among the channel units 33 shown in FIG. 5. The channel unit of the channel CH1 comprises a codec (coder/decoder) $41_1$, a hybrid circuit $42_1$, a power feed source $45_1$, switches $46_{1a}$ and $46_{1b}$, a loop current detector $47_1$, a ringing signal detector $48_1$, and resistors R1 and R2. Similarly, the channel unit of the channel CH2 comprises a codec (coder/decoder) $41_2$, a hybrid circuit $42_2$, a power feed source $45_2$, switches $46_{2a}$ and $46_{2b}$, a loop current detector $47_2$, a ringing signal detector $48_2$, and resistors R3 and R4. A signaling microprocessor 43 and a driver unit 44 are provided in common to the channel units.

The codec $41_1$ corresponds to the D/A converter 11 shown in FIG. 4, and the signaling microprocessor unit 43 corresponds to the signaling detector 12 and the ringer controller 15 shown in FIG. 4. The driver unit 44 corresponds to the switch driver 13 shown in FIG. 4.

The hybrid circuit $42_1$ connects two wires from the codec $41_1$ to a two-wire tip line $49_1$ and a two-wire ring line $50_1$. The tip line $49_1$ and the ring line $50_1$ are connected to the telephone set 1. The switch $46_{1a}$ is provided in the tip line $49_1$, and the switch $46_{1b}$ is provided in the ring line $50_1$. Normally, the switches $46_{1a}$ and $46_{1b}$ are maintained in the states illustrated in FIG. 6. That is, normally, the tip line $49_1$ and the ring line $50_1$ are connected to the hybrid circuit $42_1$.

The power feed source $45_1$ feeds power to the telephone set via the tip line $49_1$ and the ring line $50_1$. The loop current detector $47_1$, which is connected to the power feed source $45_1$, detects a loop current that flows between the tip line $49_1$ and the ring line $50_1$ when the telephone set 1 responds to the ringing signal (off-hook).

The channel unit of the channel CH2 connected to a two-wire tip line $49_2$ and a two-wire ring line $50_2$ has the same configuration as the channel unit of the channel CH1.

The signaling microprocessor unit 43 controls the structural parts of the channel units. The driver unit 44 controls the switches $46_{1a}$, $46_{1b}$, $47_{1a}$ and $47_{1b}$ under control of the signaling microprocessor unit 43.

Figure 7:
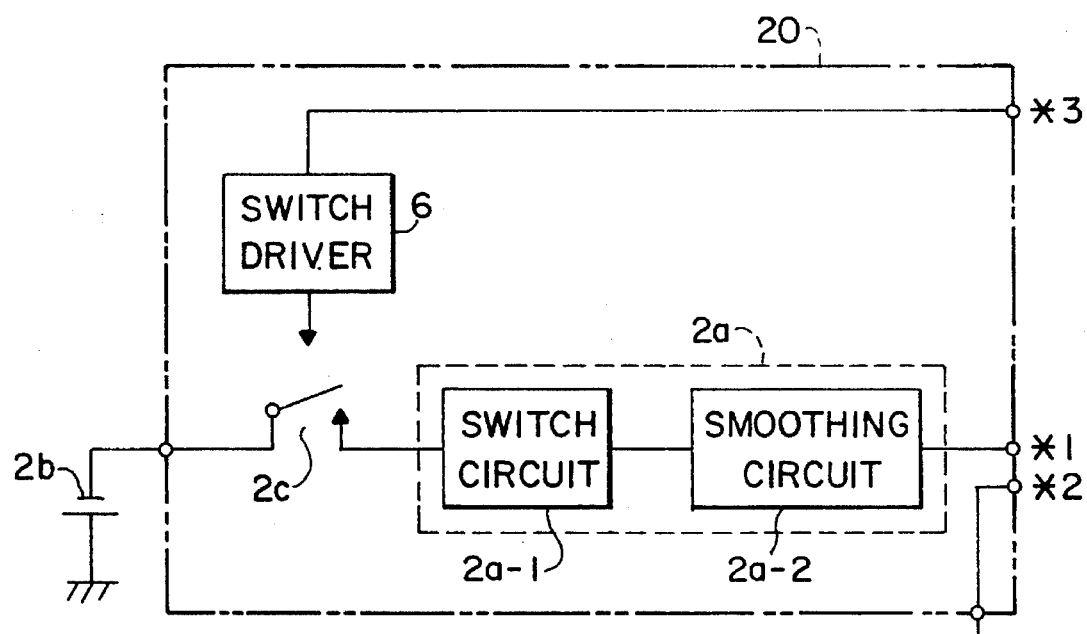
FIG. 7 is a block diagram of a ringer unit.

FIG. 7 is a block diagram of the ringer unit 20. The ringer 2a is made up of a switch circuit 2a-1 and a smoothing circuit 2a-2. The switch circuit 2a-1 performs a periodic switching operation, and generates the ringing signal having a frequency, for example, of 20 Hz. The smoothing circuit 20-2 smooths the ringing signal from the switch circuit 2a-1. In FIG. 7, the minus terminal of the ringer driving source 2b is connected to the switch 2c, and the plus terminal thereof is grounded. Whether the plus or minus terminal is grounded depends on the communications system.

An output terminal *1 of the ringer unit 20 connected to the smoothing circuit 2a-2 is connected to the switch $46_{1a}$ via the resistor R2 and to the switch $46_{2a}$ via the resistor R3. An output terminal *2 of the ringer unit 20, which terminal is grounded, is connected to the switch $46_{1b}$ via the resistor R1 and to the switch $46_{2b}$ via the resistor R4. An output terminal *3 of the ringer unit 20, which is connected to the switch driver 6, is connected to the signaling microprocessor unit 43.

A description will now be given of the operation of the configurations shown in FIGS. 6 and 7. When there are no calls directed to the telephone sets 1, the switch 2c shown in FIG. 7 is maintained in the OFF state, so that the ringer 2a is disconnected from the ringer driving source 2b.

When the telephone set 1 in the channel #1 is called from the calling terminal connected to the exchange EX, the digital signal from the exchange EX is received by the codec $41_1$. The codec $41_1$ detects the signaling bit and sends a detection signal to the signaling microprocessor unit 43. In response to the detection signal from the codec $41_1$, the signaling microprocessor unit 43 sends a driving signal to the driver unit 44, and sends another driving signal to the switch driver 6 shown in FIG. 7.

In response to the driving signal from the signaling microprocessor unit 43, the switch driver 6 turns the switch 2c ON, so that the ringer driving source 2b is connected to the ringer 2a via the switch 2c. In response to the driving signal from the signaling microprocessor unit 43, the driver unit 44 drives the switches $46_{1a}$ and $46_{1b}$ so that the tip line $49_1$ and the ring line $50_1$ are connected to the ringer 2a and the ground, respectively. Hence, the ringing signal is applied to the called telephone set 1 via the switches $46_{1a}$ and $46_{1b}$.

When the telephone set 1 is taken off-hook, the loop current detector $47_1$ connected to the power feed source $45_1$ detects the loop current which flows between the tip line $49_1$ and the ring line $50_1$. Then, the loop current detector $47_1$ outputs a loop current detection signal to the signaling microprocessor unit 43. In response to the loop current detection signal, the signaling microprocessor unit 43 stops outputting the driving signal to the switches $46_{1a}$ and $46_{1b}$, and stops outputting the driving signal to the switch driver 6. The signaling microprocessor unit 43 can identify the channel CH1 via which the ringing signal is sent to the telephone terminal 1 by referring to the ringing signal detection signal from the ringing signal detector $48_1$.

The driver unit 44 turns OFF the switches $46_{1a}$ and $46_{1b}$, and the switch driver 6 turns OFF the switch 2c.

The switches used in the embodiments of the present invention are formed with, for example, relays.

The present invention is not limited to the specifically disclosed embodiments, and variations and modifications may be made without departing from the scope of the present invention.

What is claimed is:

1. A ringer unit driving system for driving a ringer unit provided in common to channel units, the ringer unit sending a ringing signal to a communications device via one of the channel units, said ringer unit driving system comprising:

signaling bit detection means, provided in each of the channel units, for detecting a signaling bit contained in a received digital signal applied to one of the channel units and for generating a detection signal;

ringer means, provided in the ringer unit, for generating the ringing signal;

power source means for supplying the ringer means with power; and switch means, connected between the ringer means and the power source means and connected to the signaling bit detection means, for connecting the power source means and the ringer means to each other only when the signaling bit detection means generates the detection signal.

2. The ringer unit driving system as claimed in claim 1, wherein said switch means comprises:

a switch which has a control terminal and is connected between the ringer means and the power source means; and switch driving means, coupled between the control terminal of the switch and the signaling bit detection means, for generating a driving signal in response to the signaling bit detection means and for applying the driving signal to the control terminal of said switch.

3. A subscriber communications system comprising:

a plurality of channel units respectively connected to communications devices;

multiplexer means for performing multiplexing operations on transmission digital signals received from the channel units and demultiplexing operations on a reception digital signal received from a transmission line connected to the subscriber transmission system;

a ringer unit provided in common to the channel units, the ringer unit sending a ringing signal to one of the communications devices via one of the channel units; and a ringer unit driving system driving said ringer unit, said ringer unit driving system comprising:

signaling bit detection means, provided in each of the channel units, for detecting a signaling bit contained in the reception digital signal received by one of the channel units and for generating a detection signal;

ringer means, provided in the ringer unit, for generating the ringing signal;

power source means for supplying the ringer means with power; and first switch means, connected between the ringer means and the power source means and connected to the signaling bit detection means, for connecting the power source means and the ringer means to each other only when the signaling bit detection means in one of the channel units generates the detection signal.

4. The subscriber communications system as claimed in claim 3, wherein each of the channel units comprises second switch means, connected to the signaling bit detection means and one of the communications devices, for connecting the ringer means to said one of the communications devices when the signaling bit detection means generates the detection signal.

5. The subscriber communications system as claimed in claim 3, wherein each of the channel units comprises loop current detection means for detecting a loop current sent from said one of the communications devices when said one of the communications devices responds to the ringing signal and for controlling the first switching means so that the ringer unit driving means is disconnected from the ringer means when the loop current is detected.

6. The subscriber communications system as claimed in claim 3, wherein each of the channel units comprises:

second switch means, connected to the signaling bit detection means and one of the communications device, for connecting the ringer means to said one of the communications devices when the signaling bit detection means generates the detection signal; and loop current detection means for detecting a loop current sent from said one of the communications device when said one of the communications devices responds to the ringing signal and for controlling the first switching means so that the ringer unit driving means is disconnected from the ringer means when the loop current is detected.

7. The subscriber communications system as claimed in claim 3, wherein said first switch means comprises:

a switch which has a control terminal and is connected between the ringer means and the power source means; and switch driving means, coupled between the control terminal of the switch and the signaling bit detection means, for generating a driving signal in response to the detection signal and for applying the driving signal to the control terminal of said switch.

* * * * *

UNITED STATES PATENT AND TRADEMARK OFFICE
CERTIFICATE OF CORRECTION

PATENT NO.   : 5,483,592
DATED        : January 9, 1996
INVENTOR(S)  : Ishioka, et al It is certified that error appears in the above-identified patent and that said Letters Patent is hereby corrected as shown below:

On the title page, item [75] Inventors: "Got" should read --Goto--.

Signed and Sealed this

Twenty-fifth Day of June, 1996

Attest:

BRUCE LEHMAN

Attesting Officer          Commissioner of Patents and Trademarks